Patented Apr. 10, 1951

2,548,518

UNITED STATES PATENT OFFICE 2,548,518

ESTERS OF ALPHA-ACETAMINOACRYLIC ACID

Harry W. Coover, Jr., and Joseph B. Dickey, Rochester, N. Y., assignors to Eastman Kodak Company, Rochester, N. Y., a corporation of New Jersey No Drawing. Application April 13, 1949, Serial No. 87,356

19 Claims. (Cl. 260—482)

This invention relates to an improved method for making esters of α-acetaminoacrylic acid.

Although esters of α-acetaminoacrylic acid have been mentioned in the prior art, no method for their preparation has previously been described. Perhaps this is due to the fact that these esters cannot be obtained in sufficient quantities by the usual esterification processes to stimulate investigation as to their commercial possibilities. For example, when α-acetaminoacrylic acid is heated with an alcohol in the presence of hydrogen ions, no detectable esterification takes place. This agrees with the findings of Sudborough et al. who have shown that α-substituted acrylic acids are esterified with methanol in the presence of hydrogen chloride with extreme difficulty. ("Jour. Chem. Soc.," vol. 95, pp. 315–21, 975–8). One previous method that has been effective in the esterification of acids which are esterified with difficulty has been to contact the acid with an alcohol in the presence of a strong acid catalyst and a water-entraining agent, e. g. benzene. This method was found to be fruitless in the esterification of α-acetaminoacrylic acid, however. Other common methods of esterification, such as reaction of acid anhydrides or acid chlorides with alcohols have been proven unsuccessful in the case of α-acetaminoacrylic acid, since attempts to prepare the anhydrides or chlorides of the acid lead to the wholly unexpected formation of heterocyclic compounds. Bergmann and Grafe, "Zeit. für Physiolog. Chem.," vol. 187 (1930), pp. 187–195, have reported that α-acetaminoacrylic acid reacts with diazomethane to give, not, the expected methyl α-acetaminoacrylate, but rather the methyl ester of 3-acetaminopyrazoline 3-carboxylic acid instead.

It is, therefore, an object of our invention to provide a method for making esters of α-acetaminoacrylic acid. A further object is to provide a process for making esters of α-acetaminoacrylic acid in sufficient quantities to permit industrial utilization thereof. Other objects will become apparent from a consideration of the following description and examples.

According to the method of our invention we prepare esters of α-acetaminoacrylic acid by reacting an alkali metal salt of the acid with a dialkyl sulfate.

Dialkyl sulfates useful in practicing the process of our invention include those represented by the following general formula:

(RO)$_2$SO$_2$ wherein R represents an alkyl group, such as methyl, ethyl, n-propyl, isopropyl, n-butyl, isobutyl, sec-butyl, tert.-butyl, etc. groups, e. g. an alkyl group of the formula $C_nH_{2n+1}$ wherein $n$ represents a positive integer from 1 to 4. Especially useful dialkyl sulfates are the dialkyl sulfates represented by the above general formula wherein R represents a primary alkyl group.

Alkali metal salts of α-acetaminoacrylic acid include the sodium, potassium, lithium, etc. salts. These salts can advantageously be prepared by reacting α-acetaminoacrylic acid with an alkali metal hydroxide or alcoholate.

The process of our invention can be carried out in the presence or absence of an inert solvent, e. g. methanol, ethanol, aliphatic ethers, e. g. diethyl ether, diisopropyl ether, etc., cyclic ethers, e. g. 1,4-dioxane, etc., hydrocarbons, e. g. n-hexane, benzene, toluene, xylenes, etc. The dialkyl sulfates themselves can be used as a reaction medium, if desired, since they are liquid at the temperatures employed in the reaction.

Polymerization inhibitors can advantageously be employed in the reaction mixture to prevent the polymerization of the esters formed. Such inhibitors include hydroquinone, 1,3,5-trinitrobenzene, tannic acid, N,N'-diphenyl-p-phenylenediamine, copper, sulfur, etc.

The product esters can be recovered by either extracting them from the reaction mixture, precipitation, distillation, etc.

The following examples will serve to illustrate further the manner whereby we practice the process of our invention.

*Example 1.—Methyl α-acetaminoacrylate*

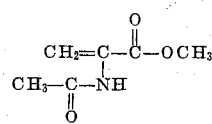

12.9 g. of α-acetaminoacrylic acid and 5.4 g. of sodium methylate in 100 cc. of methanol were refluxed together for 15 minutes. The reaction mixture was cooled and 12.6 g. of dimethyl sulfate containing a trace of 1,3,5-trinitrobenzene were added, and the reaction mixture was refluxed for one hour. 100 cc. of diethyl ether were added and the precipitated salt filtered. After distilling off the diethyl ether and methanol, the remaining viscous product was fractionally distilled to give methyl α-acetaminoacrylate boiling at 66°–67° C./0.3 mm. It melted at 75°–76° C.

By replacing the dimethyl sulfate in the above example by a molecularly equivalent amount of di-n-butylsulfate, n-butyl α-acetaminoacrylate represented by the formula:

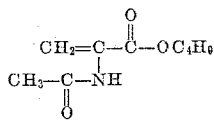

can be obtained. The sodium salt of α-acetaminoacrylic acid can be advantageously replaced by a molecularly equivalent amount of the potassium salt, if desired.

*Example 2.—Ethyl α-acetaminoacrylate*

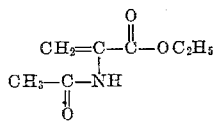

12.9 g. of α-acetaminoacrylic acid were dissolved in 50 cc. of water in which 4 g. of sodium hydroxide had been dissolved. The reaction mixture was then evaporated to dryness under reduced pressure. The crude sodium α-acetaminoacrylate was then recrystallized from methanol to give a pure, crystalline salt.

15.1 g. of this sodium α-acetaminoacrylate were added to a reaction vessel containing 100 cc. of ethanol. 15.4 g. of diethyl sulfate and a trace of 1,3,5-trinitrobenzene were added to the reaction mixture, and the mixture refluxed for one hour. 100 cc. of diethyl ether were then added and the salt, which precipitated, filtered off. The filtrate was then distilled and the diethyl ether and ethanol removed. On fractionation of the viscous residue, ethyl α-acetaminoacrylate was obtained as a distillate boiling at 74° C./0.5 mm.

By replacing the diethyl sulfate in the above example by a molecularly equivalent amount of diisopropyl sulfate, isopropyl α-acetaminoacrylate represented by the formula:

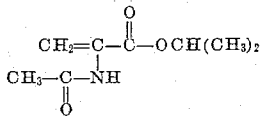

can be obtained.

*Example 3.—Methyl α-acetaminoacrylate*

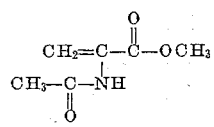

15.1 g. of sodium α-acetaminoacrylate obtained as described in Example 2 above were added to a reaction vessel containing 100 cc. of methanol. A trace of 1,3,5-trinitrobenzene and 12.6 g. of dimethyl sulfate were added and the mixture was refluxed for one hour. 100 cc. of diethyl ether were added and the sodium sulfate which precipitated was filtered off. The filtrate was then distilled under reduced pressure and the diethyl ether and methanol removed. The viscous residue was then recrystallized from diisopropyl ether to give methyl α-acetaminoacrylate as long needle-like crystals melting at 75°–76° C.

Operating in a manner similar to that employed in the above examples, other alkali metal salts of α-acetaminoacrylic acid can be reacted with a dialkyl sulfate and the desired esters obtained. Similarly esters other than those specifically described above can be prepared utilizing the process of our invention. Higher alkyl esters, e. g. octyl α-acetaminoacrylate, can be prepared by utilizing higher dialkyl sulfates. The lower alkyl α-acetaminoacrylates are of particular interest since they can be readily polymerized alone or in admixture with other polymerizable materials to give polymers useful for molding purposes, casting into sheets, etc.

What we claim as our invention and desire secured by Letters Patent of the United States is:

1. A process for preparing alkyl esters of α-acetaminoacrylic acid comprising heating an alkali metal salt of α-acetaminoacrylic acid with a dialkyl sulfate.

2. A process for preparing alkyl esters of α-acetaminoacrylic acid comprising heating an alkali metal salt of α-acetaminoacrylic acid with a dialkyl sulfate represented by the following general formula:

$$(RO)_2SO_2$$

wherein R represents an alkyl group of the formula $C_nH_{2n+1}$ wherein $n$ represents a positive integer from 1 to 4.

3. A process for preparing alkyl esters of α-acetaminoacrylic acid comprising heating the sodium salt of α-acetaminoacrylic acid with a dialkyl sulfate represented by the following general formula:

$$(RO)_2SO_2$$

wherein R represents an alkyl group of the formula $C_nH_{2n+1}$ wherein $n$ represents a positive integer from 1 to 4.

4. A process for preparing primary alkyl esters of α-acetaminoacrylic acid comprising heating an alkali metal salt of α-acetaminoacrylic acid with a dialkyl sulfate represented by the following general formula:

$$(RO)_2SO_2$$

wherein R represents a primary alkyl group of the formula $C_nH_{2n+1}$ wherein $n$ represents a positive integer from 1 to 4.

5. A process for preparing primary alkyl esters of α-acetaminoacrylic acid comprising heating the sodium salt of α-acetaminoacrylic acid with a dialkyl sulfate represented by the following general formula:

$$(RO)_2SO_2$$

wherein R represents a primary alkyl group of the formula $C_nH_{2n+1}$ wherein $n$ represents a positive integer from 1 to 4.

6. A process for preparing alkyl esters of α-acetaminoacrylic acid comprising heating in the presence of a polymerization inhibitor an alkali metal salt of α-acetaminoacrylic acid with a dialkyl sulfate represented by the following general formula:

$$(RO)_2SO_2$$

wherein R represents an alkyl group of the formula $C_nH_{2n+1}$ wherein $n$ represents a positive integer from 1 to 4.

7. A process for preparing alkyl esters of α-acetaminoacrylic acid comprising heating in the presence of a polymerization inhibitor the sodium salt of α-acetaminoacrylic acid with a dialkyl sulfate represented by the following general formula:

$$(RO)_2SO_2$$

wherein R represents an alkyl group of the formula $C_nH_{2n+1}$ wherein $n$ represents a positive integer from 1 to 4.

8. A process for preparing primary alkyl esters of α-acetaminoacrylic acid comprising heating in the presence of a polymerization inhibitor an alkali metal salt of α-acetaminoacrylic acid with a dialkyl sulfate represented by the following general formula:

$$(RO)_2SO_2$$

wherein R represents a primary alkyl group of the formula $C_nH_{2n+1}$ wherein $n$ represents a positive integer from 1 to 4.

9. A process for preparing primary alkyl esters of α-acetaminoacrylic acid comprising heating in the presence of a polmerization inhibitor the sodium salt of α-acetaminoacrylic acid with a dialkyl sulfate represented by the following general formula:

$$(RO)_2SO_2$$

wherein R represents a primary alkyl group of the formula $C_nH_{2n+1}$ wherein $n$ represents a positive integer from 1 to 4.

10. A process for preparing methyl α-acetaminoacrylate comprising heating an alkali metal salt of α-acetaminoacrylic acid with dimethyl sulfate.

11. A process for preparing methyl α-acetaminoacrylate comprising heating the sodium salt of α-acetaminoacrylic acid with dimethyl sulfate.

12. A process for preparing methyl α-acetaminoacrylate comprising heating in the presence of a polymerization inhibitor an alkali metal salt of α-acetaminoacrylic acid with dimethyl sulfate.

13. A process for preparing methyl α-acetaminoacrylate comprising heating in the presence of a polymerization inhibitor the sodium salt of α-acetaminoacrylic acid with dimethyl sulfate.

14. A process for preparing ethyl α-acetaminoacrylate comprising heating an alkali metal salt of α-acetaminoacrylic acid with diethyl sulfate.

15. A process for preparing ethyl α-acetaminoacrylate comprising heating the sodium salt of α-acetaminoacrylic acid with diethyl sulfate.

16. A process for preparing ethyl α-acetaminoacrylate comprising heating in the presence of a polymerization inhibitor an alkali metal salt of α-acetaminoacrylic acid with diethyl sulfate.

17. A process for preparing ethyl α-acetaminoacrylate comprising heating in the presence of a polymerization inhibitor the sodium salt of α-acetaminoacrylic acid with diethyl sulfate.

18. A process for preparing methyl α-acetaminoacrylate comprising heating in the presence of trinitrobenzene the sodium salt of α-acetaminoacrylic acid with dimethyl sulfate.

19. A process for preparing ethyl α-acetaminoacrylate comprising heating in the presence of trinitrobenzene an alkali metal salt of α-acetaminoacrylic acid with diethyl sulfate.

HARRY W. COOVER, Jr.
JOSEPH B. DICKEY.

REFERENCES CITED

The following references are of record in the file of this patent:

UNITED STATES PATENTS

| Number | Name | Date |
| --- | --- | --- |
| 1,924,575 | Spring | Aug. 29, 1933 |

OTHER REFERENCES

Bergmann: Zeit Physiol Chem., 187, 183–186 (1930).